US012155496B2

United States Patent
Szelest et al.

(10) Patent No.: US 12,155,496 B2
(45) Date of Patent: Nov. 26, 2024

(54) VEHICLE VIDEO CONFERENCING SYSTEM

(71) Applicant: APTIV TECHNOLOGIES LIMITED, Dublin (IE)

(72) Inventors: Marcin Szelest, Cracow (PL); Kamil Klimowicz, Klaj (PL); Dariusz Marchewka, Cracow (PL); Pawel Markiewicz, Cracow (PL)

(73) Assignee: APTIV TECHNOLOGIES LIMITED, Schaffhausen (CH)

( * ) Notice: Subject to any disclaimer, the term of this patent is extended or adjusted under 35 U.S.C. 154(b) by 0 days.

(21) Appl. No.: 17/940,235

(22) Filed: Sep. 8, 2022

(65) Prior Publication Data

US 2023/0093198 A1    Mar. 23, 2023

(51) Int. Cl.
*H04L 12/18* (2006.01)
*G06V 10/82* (2022.01)
*G06V 20/59* (2022.01)
*G06V 40/16* (2022.01)

(52) U.S. Cl.
CPC .......... *H04L 12/1822* (2013.01); *G06V 10/82* (2022.01); *G06V 20/59* (2022.01); *G06V 40/161* (2022.01); *G06V 40/171* (2022.01); *G06V 40/174* (2022.01)

(58) Field of Classification Search
CPC .. H04L 12/1822; G06V 20/59; G06V 40/174; G06V 40/171; G06V 40/161; G06V 10/82
USPC ....................................................... 709/204
See application file for complete search history.

(56) References Cited

U.S. PATENT DOCUMENTS

| 8,320,893 | B2 * | 11/2012 | Suurmeyer | H04M 3/56 340/425.5 |
| 10,628,931 | B1 | 4/2020 | Ramos et al. | |
| 10,666,901 | B1 * | 5/2020 | Zhang | H04L 65/80 |
| 10,708,542 | B1 * | 7/2020 | Griffin | H04W 4/40 |
| 10,803,646 | B1 * | 10/2020 | Bogan, III | G06N 3/088 |
| 10,904,488 | B1 | 1/2021 | Weisz et al. | |
| 2010/0127847 | A1 * | 5/2010 | Evans | G06F 3/04886 345/173 |

(Continued)

FOREIGN PATENT DOCUMENTS

| EP | 4027638 A1 * | 7/2022 | ......... G06K 9/00268 |
| EP | 4113982 A1 | 1/2023 | |

(Continued)

OTHER PUBLICATIONS

Combined Search Report and Examination Report issued by the European Patent Office in connection with International Application No. GB2113335.0, dated Mar. 10, 2022.

(Continued)

*Primary Examiner* — Tauqir Hussain
(74) *Attorney, Agent, or Firm* — Miller Johnson

(57) ABSTRACT

The system for in-vehicle video conferencing includes: an acquisition module for acquiring data of facial characteristic points of a user in the vehicle during a video conference call in which said user participates; a video synthesizer for producing an artificial video of the face of the user in the vehicle from the acquired data of facial characteristic points; and a communication device for transmitting the artificial video of the face of the user through a communication network in the video conference call.

10 Claims, 4 Drawing Sheets

(56) References Cited

U.S. PATENT DOCUMENTS

| | | | | |
|---|---|---|---|---|
| 2014/0303807 A1* | 10/2014 | Addepalli | ............... | H04L 67/60 |
| | | | | 701/1 |
| 2018/0189581 A1 | 7/2018 | Turcot et al. | | |
| 2021/0042503 A1 | 2/2021 | Karras et al. | | |
| 2021/0276570 A1* | 9/2021 | Kusaka | ................ | G06V 20/597 |
| 2023/0055583 A1* | 2/2023 | Berthold | ................ | G06V 40/16 |

FOREIGN PATENT DOCUMENTS

| | | | | |
|---|---|---|---|---|
| JP | 2018160799 A | * 10/2018 | ............. | G06F 21/32 |
| WO | WO-2021063012 A1 | * 4/2021 | ......... | G06K 9/00268 |

OTHER PUBLICATIONS

Examination Report for GB2113335.0 dated Apr. 5, 2024, 4 pages.
Extended European Search Report for EP22195879.6 dated Feb. 20, 2023, 11 pages.

* cited by examiner

VEHICLE VIDEO CONFERENCING SYSTEM

CROSS-REFERENCE TO RELATED APPLICATION

This application claims the benefit of Great Britain patent application serial number GB2113335.0 filed on Sep. 17, 2021. The entire contents of which are hereby incorporated by reference herein.

TECHNICAL FIELD

The present disclosure relates to the field of in-vehicle video conferencing systems.

BACKGROUND

In the automotive industry, it is desired to provide the driver and occupants of a vehicle with an in-vehicle video conference call service.

Modern vehicles are already equipped with camera devices that can record images in visible and/or infrared light. The existing camera devices are typically used in systems for monitoring the driver and/or the cabin, also termed as DMS (Driver Monitoring System) and CMS (Cabin Monitoring System).

With the camera devices already present in the vehicles, the quality of the images is not satisfactory for making a video conference. The captured images have many defects: wrong angle of view, images including an occupant of the vehicle that does not want to participate in the video conference, gray-scale images, lens effects distorting the images, overexposed images for example during sunrise or sunset, blurry images due to a long exposure time in case of low light.

To implement an in-vehicle video conference, it is desired to obtain high-quality images of the driver and/or of any occupant of the vehicle desiring to attend the video conference. For this purpose, the in-vehicle video conferencing system should satisfy various requirements, as for example:

- high resolution images;
- images captured with an angle of view suitable for video conferencing, for example images taken from the front of the user;
- dedicated cameras aimed at the position of each occupant in the vehicle;
- a vehicle infotainment bus having a bandwidth that accommodates the large bandwidth of high-resolution cameras;
- cameras operable to capture high-quality images even in low light conditions;
- during the video conference, only participant(s) should be visible.

It seems difficult to satisfy all the above requirements. In addition, it implies a significant additional cost for implementing the in-vehicle video conference system that satisfies them all.

Therefore, there is a need for an in-vehicle system for video conferencing that provides high-quality video calls and is economical.

SUMMARY

The present disclosure concerns a system for in-vehicle video conferencing including:
an acquisition module for acquiring data of facial characteristic points of a user in the vehicle during a video conference call in which said user participates;
a video synthesizer for producing an artificial video of the face of the user in the vehicle from the acquired data of facial characteristic points,
a communication device for transmitting the artificial video of the face of the user through a communication network in the video conference call.

The present in-vehicle video conferencing system allows to represent the user in the vehicle with video images of a desired quality, for example high resolution images, during the video conference call. It does not require the use of a high-resolution imaging unit to capture images of the user in the vehicle. It is only required to acquire facial characteristic points of the user in the vehicle. This can be achieved with an image sensor of low resolution.

In an embodiment, the system further includes an imaging system for capturing image data of the user's face and determining said data of facial characteristic points of the user by processing the captured image data.

In an embodiment, the imaging system includes a driver monitoring system.

In an embodiment, the imaging system includes at least one of a cabin monitoring system and an occupant monitoring system.

The system can use the existing driver monitoring system and/or the existing cabin monitoring system to acquire the facial characteristic points of the user in the vehicle, who participates to the video conference call. In that case, it is not necessary to install any additional imaging unit or camera device in the vehicle to perform in-vehicle video conference calls. This is cheap way to provide the in-vehicle video conference service to users. The in-vehicle conferencing system uses the DMS and/or CMS equipment of the vehicle, not only for safety purpose, but to make video conference calls.

In an embodiment, the video synthesizer is included in the vehicle. For example, the artificial video of the user's face is produced by an infotainment system of the vehicle.

In an alternative embodiment, the video synthesizer is located remotely from the vehicle and connected to the vehicle through the communication network, and the communication device in the vehicle is operable for transmitting the data of facial characteristic points of the user in the vehicle to the video synthesizer through the communication network. Thanks to that, there is no need to provide the vehicle with computational means for generating the artificial video of the user. Furthermore, it requires little bandwidth to upload the data related to the facial characteristic points.

In an embodiment, the video synthesizer includes a deepfake algorithm.

The deepfake technology allows to create images of the user that look like real images. Alternatively, the video synthesizer could generate images of a computer avatar representing the user. The avatar may inform the remote participant(s) that the user is driving a vehicle, for example by a specific appearance or design of the avatar and/or by an attribute of the avatar (such as a signaling icon). The information may impact the conversation and improve the safety of the user driving the vehicle.

In an embodiment, the video synthesizer includes a machine learning model.

For the training, the system can further include a display unit for displaying a plurality of facial movements and requesting said user to repeat the displayed facial movements, during a learning process;
a first camera device for capturing images of the user repeating the displayed facial movements and determining facial characteristic points from the captured images;
a second camera device for simultaneously capturing facial videos of the face of the user repeating the displayed facial movements;
a training data generator, connected to the first camera device and the second camera device, that generates a training dataset including facial characteristic points determined by the first camera device, as input training data, and corresponding facial videos determined by the second camera device, as output training data, and provides the training dataset to the machine learning model of the video synthesizer so as to fit said machine learning model to the user.

For example, the means for training the machine learning model can be installed in a specific place, that the user is requested to visit to perform a learning process and train the machine learning model.

In an embodiment, a position of the user during the learning process being predefined, the first camera device is positioned in relation to said predefined position as the imaging system is positioned in the vehicle in relation the position of an occupant of the vehicle, and the second camera device is positioned in front of said predefined position so as to take video images of the user from the front.

This allows the machine learning model to later generate artificial video images taken from the front of the user in the vehicle, during a video conference call.

In a variant, a camera device of the imaging system in the vehicle is used as the first camera device, and a smartphone of the user is used as the display unit and the second camera device.

In an embodiment, the system further includes a first selector or filter for selecting the data of facial points of one us er in the vehicle among the data of facial points of a plurality of occupants in the vehicle.

Thanks to that, it is possible to select only the facial points that belong to one specific user, even when the imaging system capture images including several users in the vehicle.

In an embodiment, the system includes
an input means for inputting an identifier of the user in the vehicle participating to the video conference call;
a second selector for selecting, among a plurality of video synthesizers each associated with one corresponding user, the video synthesizer corresponding to the inputted identifier,
wherein the artificial video of the face of the user is produced by the selected video synthesizer.

The present disclosure also concerns a vehicle including the system for video conferencing as previously defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
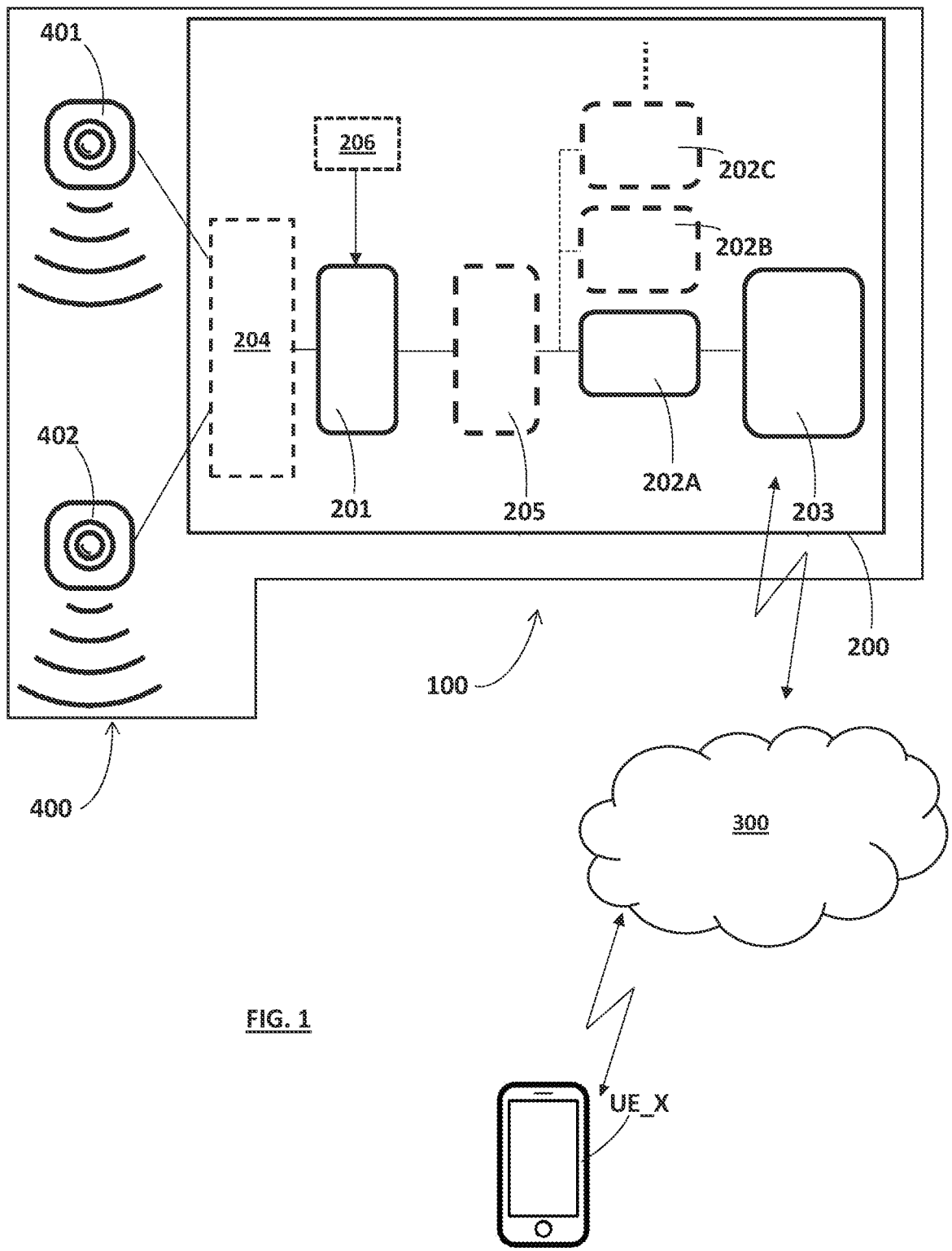
FIG. 1 shows a system for in-vehicle video conferencing, according to an embodiment.
Figure 2:
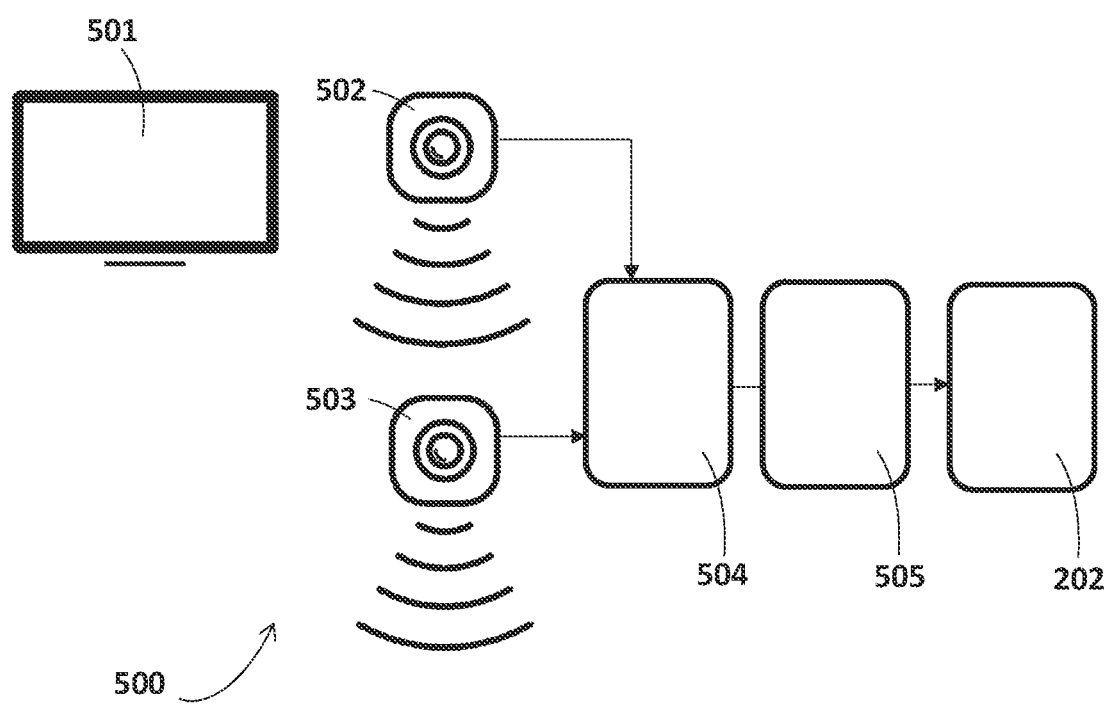
FIG. 2 shows an installation for training the system for in-vehicle video conferencing, according to an embodiment.

The present disclosure concerns a system 200 for in-vehicle video conferencing. It allows at least one user (driver and/or occupant), for example a user referenced as "A", in a vehicle 100 to participate to a video conference call through a mobile communication network 300 (e.g., a 5G network).

In an embodiment, the system 200 includes an acquisition module 201, a video synthesizer 202, and a communication device 203, located within the vehicle 100. The system 200 can include hardware elements (e.g., processing device, memory, circuitry, etc.) and/or software elements (such as instructions running on a processing device).

The acquisition module 201 is responsible for acquiring data of facial characteristic points (in other words: facial characteristic point) of the user A (driver or passenger) in the vehicle 100 during a video conference call in which the user A participates. It could be part of the video synthesizer 202.

The facial characteristic point data is acquired from an imaging system 400 of the vehicle 100, to which the acquisition module 201 is connected. The imaging system 400 is responsible for capturing image data of the face of a user (driver or passenger) in the vehicle 100. In an embodiment, the imaging system 400 is also responsible for determining facial characteristic point data of the user by processing the captured image data. The facial characteristic points include a limited number of points of the face of the user such as points related at least to the eyes, the mouth, the nose of the user. Additionally, the facial characteristic points could include characteristic points related to the forehead, the eyebrows and/or the chin of the user.

In an embodiment, the imaging system 400 includes a driver monitoring system (DMS) 401. Optionally, it can also include a cabin monitoring system (CMS) 402, and/or an occupant monitoring system (not represented). The driver monitoring system 401 is a vehicle safety system to assess the driver's alertness and warn the driver if needed. It is operable for monitoring the driver's face. In operation, it captures image data of the driver, focusing on the driver's face, with one or more image sensors and determines facial characteristic points of the driver by processing the captured image data. The cabin monitoring system 402 is responsible for monitoring the interior of the vehicle, including the occupants of the vehicle. In operation, the cabin monitoring system 402 captures image data of the one or more occupants of the vehicle with one or more image sensors and determines facial characteristic points of the one or more occupants by processing the captured image data.

The video synthesizer 202A has the role of producing an artificial video of the face of the user A in the vehicle 100 from facial characteristic point data of the user A acquired by the acquisition module 201. In an embodiment, the video synthesizer includes a deepfake algorithm using a machine learning approach to generate the artificial video of the face of the user A. The machine learning model is for example a neural network or a deep learning network. The video synthesizer 202A can be a software element including program instructions and running on a processing unit.

In an embodiment, the artificial video generated by the video synthesizer 202A includes video images of the face of the user A that look real (in other words: very similar to the real face of the user A). In another embodiment, the video synthesizer 202A produces video images of the face of the user A representing a computer avatar of the user A (in other words: a visual representation of the user A that does not look real but is virtual).

The deepfake machine learning model must be preliminary trained to learn connection between facial characteristic points of the user A acquired over time and video images of the real face of the user A.

In an embodiment, a system 500 is used for training the deepfake machine learning model and learning the connection between facial characteristic points of the user A acquired over time and video images of the face of the user A, during a learning (or training) process. The system 500 can include a display unit 501, a first camera device 502, a second camera device 503, a training data generator 504, and a training module 505. It includes a mix of hardware elements (processing unit, memory, sensor, circuitry, etc.) and software elements (such as instructions running on a processing unit, etc.).

The display unit 501 has the role of displaying a plurality of facial movements (in other words: facial motions and/or expressions) and requesting the user A to repeat the displayed facial movements, during a learning (training) process.

The first camera device 502 is operable for capturing image data of the user A repeating the facial movements displayed by the display unit 501 and for determining facial characteristic points from the captured image data.

The second camera device 503 is operable for simultaneously capturing facial videos of the face of the user A, while the user A is repeating the facial movements displayed by the display unit 501.

The training data generator 504, connected to the first camera device 502 and second camera device 503, has the role of generating a training dataset for training the deepfake machine learning model. The training dataset includes facial characteristic points determined by the first camera device 502, as input training data, and corresponding facial videos of the user A determined by the second camera device 503, as output training data. In the learning process, the generator 504 provides the training dataset to the deepfake machine learning model of the video synthesizer 200 so as to fit it to the user A. The training data generator 504 can include software running on a processing unit (not represented).

In an embodiment, a position P of the user A during the learning process is predefined and the first camera device 502 is positioned in relation to said predefined position P in the same way as the imaging system 400, for instance the driver monitoring system 401, is positioned in the vehicle 100 in relation the driver's position in the vehicle 100. In particular, the angle of view of the first camera device 502 and the distance between the first camera device 502 and the predefined position P are similar to the angle of view of the driver monitoring system 401 and the distance between the driver monitoring system 401 and the (conventional or usual) driver's position in the vehicle 100. The second camera device 503 is positioned in front of the predefined position P so as to capture video images of the user A from the front.

The training module 505 is responsible for controlling the execution of a learning or training process, as described later. It can include a software element running on a processing unit.

The images captured by the imaging system 400 in the vehicle 100 may include a plurality of occupants of the vehicle 100, for example the driver and one or more passengers seated next to the driver or in the rear seats of the vehicle 100, while only one occupant (or only a part of the occupants) participates to a video conference call in progress. In an embodiment, the in-vehicle video conferencing system 200 has a filter (or first selector) 204 to filter the collected points (pixels or image data) and to only pass the face points belonging to the participant(s) for further processing. The filtering can be made on the facial characteristic points of occupants of the vehicle 100 or on the image data captured by the imaging system 400.

In an embodiment, the filter (or first selector) 204 is operable for filtering the facial characteristic points of the occupants of the vehicle 100 (provided by the imaging system 400) and for only passing the facial characteristic points related to the face of the participant(s) to the video conference for further processing. The facial characteristic point data of the other occupant(s) of the vehicle 100, that do not participate to the video conference call, are discarded or deleted. For example, when only the driver participates to a video conference call, the facial characteristic points related to the other passenger(s) are discarded (deleted). When another person is present in the vehicle but does not participate to the video conference call in progress, the filter 204 discards (deletes) the facial points corresponding to said other person. The selection can be based on the position and/or angle of view of the facial points in the captured images.

In operation, the first selector or filter 204 filters the captured images by selecting the facial points of the only participant(s) to the video conference call and deleting the image data (in particular the face points) of the other occupants of the vehicle.

In a variant, the filter (or first selector) could be operable for filtering the image data (pixels or image points) captured by the imaging system 400 and for only passing the image data related to the face of the participant(s) to the video conference for further processing.

The selection or filtering can be based on a user input, made via any appropriate input element (means) 20, indicating the user(s) participating to the video conference call.

In an embodiment, the first selector or filter 204 is part of the system 200 for in-vehicle video conferencing. It could be included in the acquisition module 201. Alternatively, the first selector or filter 204 could be part of the imaging system 400.

The video conferencing system 200 can be operable for making video conference calls not only for the user A but also for other user(s) B, C, etc., of the vehicle 100. For that purpose, the system 200 can have different video synthesizers 202A, 202B, 202C, . . . for the different users A, B, C, . . . respectively. Each video synthesizer 202 corresponds to one user. It has been trained by the training system 500 with images of the corresponding user A, B, C, . . . captured by the two camera devices 502, 503, as previously described.

In an embodiment, the system 200 further includes a second selector 205 for selecting, among the plurality of video synthesizers 202A, 202B, 202C, . . . the video synthesizer(s) to be used in a video conference call. The video synthesizers 202A, 202B, 202C, . . . can be associated in memory to the corresponding user identifiers (in other words: each video synthesizer 202 corresponding to one user is associated with the identifier of said user). Thus, the selection of the video synthesizer to be used in a video conference call can be made based on the identifier of the specific user participating to the video conference call. The user identifier can be inputted by the user with the input means 206 (or input element). For example, the input means 206 can be a tactile screen of a display device in the vehicle 100, that displays a list of selectable user identifiers. Any other type of input means 206 could be used. The user identifier acquired by the input means 206 is used to select the corresponding video synthesizer 202 to be used during the video conference call.

Figure 3:
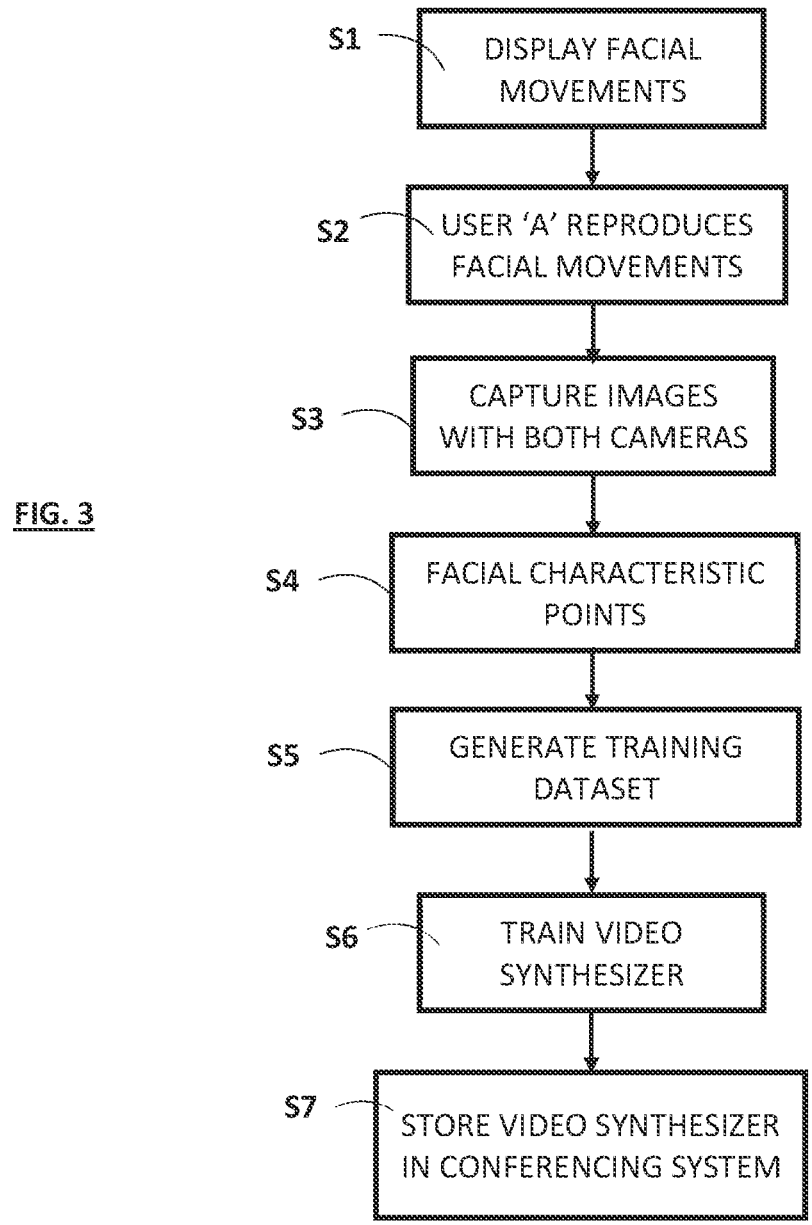
FIG. 3 shows a flowchart of a method for in-vehicle video conferencing, at a training stage.
Figure 4:
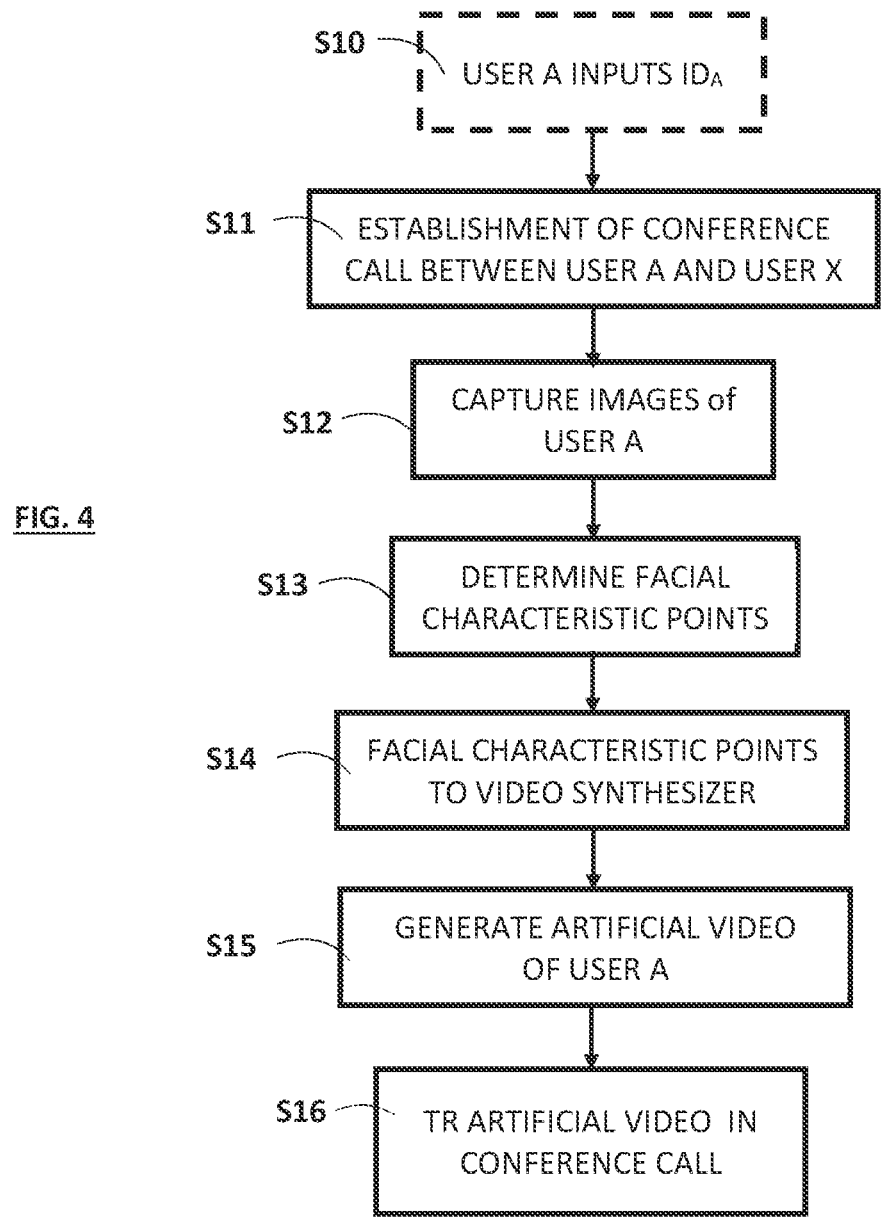
FIG. 4 shows a flowchart of a method for in-vehicle video conferencing, at an operation (inference) stage.

A computer-implemented method of in-vehicle video conferencing will now be described with reference to FIGS. 3 and 4, according to an embodiment. FIG. 3 illustrates a process of training a video synthesizer 202 for a specific user, here the user A, according to an embodiment. FIG. 4 illustrates a method of performing a video conference call in the vehicle 100 through the communication network 300, according to an embodiment.

At a training stage (FIG. 3), the video synthesizer 202 is trained to learn a connection between facial characteristic points of the user A acquired by a first imaging unit and video images of the user A captured by a second imaging unit. The first imaging unit can take images of low resolution, using any type of image sensor (camera, IR sensor, radar sensor, etc.). It is only required that the quality of the images captured should be sufficient to allow the acquisition of facial characteristic points of the user A by processing the captured images. The second imaging unit is advantageously capable of taking video images of high-resolution, or at least video images having a desired resolution for in-vehicle video conference calls. In the training process, the role of the first imaging unit is taken by the first camera device 502 and the role of the second imaging unit is taken by the second camera device 503. For this purpose, the user A visits a place equipped with the training system 500.

In a first step S1, the display unit 501 displays a sequence of predefined facial movements and/or expressions (e.g., close right eyes, turn the head right/left, turn the head up/down, smile, laugh, . . . ) that the user A is requested to reproduce. Alternatively, a loudspeaker (or any other type of output element) could instruct the user A to execute the predefined facial movements and/or expressions.

While the user A is reproducing the predefined facial movements in a step S2, the first camera device 502 and the second camera device 503 both simultaneously capture images of the user A, in a step S3.

In a step S4, the first camera device 502 processes the captured images of the user A and determines facial characteristic points from the captured images.

In a step S5, the training data generator 504 generates a training dataset that includes, as input training data, data of the facial characteristic points of the user A acquired by the first camera device 502, and, as output training data, corresponding facial video images acquired by the second camera device 503. Training data is generated for the plurality of predefined facial movements executed by the user A.

In a step S6, the training dataset is provided to the deepfake machine learning model of the video synthesizer 202 to train it and thus fit the video synthesizer 202 to the user A. Once it has been trained on the user A, the video synthesizer can be referenced as 202A.

In a step S7, the trained video synthesizer 202A is transmitted to the in-vehicle video conferencing system 200, for example through the mobile communication network 300, and stored in the system 200 in the vehicle 100.

Then, the video synthesizer 202A can be used during a video conference call to which the user A participates, in the vehicle 100.

FIG. 4 illustrates the process of performing a video conference call between the user A in the vehicle 100 and another user X, equipped with a user equipment UE_X (communication device), at a remote location from the vehicle 100, through the mobile communication network 300.

In a step S10, the user A enters its identifier IDA into the system 200 via the input means 206. Thus, the video conferencing system 200 is informed that the user A wants to participate to a video conference call. The step S10 is optional. Alternatively, the user A is a default user of the video conferencing system 200 and there is no need for the user A to enter his/her identifier.

In a step S11, a video conference call is established between the user A in the vehicle 100 and the other user equipment UE_X (located remotely from the vehicle 100), through the mobile communication network 300. The step S10 could be performed at the same time as step S11 or shortly after establishment of the conference call, in particular in case of an incoming call.

In a step S12, the imaging system 400 of the vehicle 100 takes images of the user A. For example, the user A is the driver and images of the user A are captured over time by the driver monitoring system 401. The captured images are processed by the driver monitoring system 401 to determine facial characteristic points of the user A, in a step S13. The data related to the determined facial characteristic points of the user A are acquired by the acquisition module 201 and provided to the video synthesizer 202A, in a step S14.

In a step S15, during the video conference call, the video synthesizer 202A generates an artificial video of the user A by using the facial characteristic points as input data. The generated artificial video artificially reproduces the movements and expressions of the face of the user A, based on the facial characteristic points. In the generated video, the user A can appear as a real person, or as a computer avatar.

In a step S16, the generated video is transmitted in the video conference call through the mobile communication network 300. The other user equipment UE_X receives the generated artificial video images.

In the embodiment previously described, the video synthesizer 202A is located in the vehicle 100. In another embodiment, the video synthesizer 202A is located remotely from the vehicle 100, for example in a cloud system or in a server. In that case, during the video conference call, the facial characteristic point data acquired over time from the imaging system 400 in the vehicle 100 is transmitted (uploaded) in real time from the vehicle 100, for example via the communication device 203, to the cloud system or server, through the mobile communication network 300. In the cloud system (or server), the video synthesizer 202A generates the artificial video of the user A and the server returns the generated artificial video to the in-vehicle video conferencing system 200 via the mobile communication network 300. Then, the communication device 203 transmits the artificial video images of the user A in the video call conference through the mobile communication network 300, in a step S16. Alternatively, the cloud system or server could provide a video call service. In such a case, the cloud system or server can directly transmit the generated artificial video images in the video conference call (without transferring it to the in-vehicle video conferencing system 200)

For training the video synthesizer 202, the user A could be seated in the vehicle 100 and use a smartphone. In that case, the first camera device 502 could be part of the imaging system 400 in the vehicle 100. For example, the driver monitoring system 401 is used as the first camera device 502 and the user smartphone is used as the display unit 501 and as the second camera device 503. During the training process, the user A can seat in the driver position and position the smartphone in front of him. The smartphone displays on its screen the sequence of facial movements and requests the user A to reproduce them. The driver monitoring system 401 takes images of the user A reproducing the facial movements and determines the corresponding facial characteristic points. At the same time, the user smartphone can take video images of the user A. The smartphone acquires the facial characteristic point data of the user A from the driver monitoring system 401, for example via a wireless communication. Then, the smartphone can generate a training dataset from the acquired facial characteristic point data and the video images captured by the smartphone, and use the training dataset to train the video synthesizer 202, as explained before. After training, the trained video synthesizer 202A is transmitted from the smartphone to the video conference system 200 in the vehicle 100, for example via a wireless communication. Alternatively, the trained video synthesizer 202A is transmitted to the server or the cloud system.

The present disclosure provides multiple advantages. It makes possible to perform high-quality video conference calls from the vehicle 100. Furthermore, it does not require a high-quality imaging system in the vehicle 100. During a video call, the images of the user in the vehicle can be taken by a low-cost image sensor having low resolution. Another advantage is that the in-vehicle video conferencing system can use an imaging system that already exists in the modern vehicles, like a driver monitoring system or a cabin monitoring system. There is no need to install an additional camera device in the vehicle. Another advantage is that the extra amount of data that is transmitted though the vehicle CAN bus is very limited, as it only includes the data related to the facial characteristic points. This small amount of data transmitted allows to outsource the video synthesizer into a remote server or cloud system. In that case, the in-vehicle system only captures and filters facial points that are then saved to the cloud system (or remote server). The cloud system (or remote server) returns the synthesized face and can provide a video call service.

The invention claimed is:

1. A system for in-vehicle video conferencing including:
an imaging system including at least one image sensor configured to capture low-resolution images of a face of a user in the vehicle, and configured to determine data of facial characteristic points of the user by processing the captured low-resolution images;
an acquisition module for acquiring the determined data of facial characteristic points of the user in the vehicle during a video conference call in which the user participates;
a video synthesizer for producing artificial high-resolution video images of the face of the user in the vehicle from the acquired data of facial characteristic points;
a communication device for transmitting the artificial high-resolution video images of the face of the user through a communication network in the video conference call, wherein the video synthesizer includes a deepfake machine learning model for generating the artificial high-resolution video images of the face of the user from the acquired facial characteristic point data of the user, said machine learning model being preliminary trained to learn connection between facial characteristic points of the user acquired over time and high-resolution video images of the real face of the user;
a display unit for displaying a plurality of facial movements and requesting the user to repeat the displayed facial movements, during a learning process;
a first camera device for capturing images of the user repeating the displayed facial movements and determining facial characteristic points from the captured images;
a second camera device for simultaneously capturing facial videos of the face of the user repeating the displayed facial movements; and
a training data generator, connected to the first camera device and the second camera device, that generates a training dataset including facial characteristic points determined by the first camera device, as input training data, and corresponding facial videos determined by the second camera device, as output training data, and provides the training dataset to the machine learning model of the video synthesizer so as to fit said machine learning model to the user.

2. The system according to claim 1, wherein the imaging system includes a driver monitoring system.

3. The system according to claim 1, wherein the imaging system includes at least one of a cabin monitoring system or an occupant monitoring system.

4. The system according to claim 1, wherein the video synthesizer is included in the vehicle.

5. The system according to claim 1, wherein the video synthesizer is located remotely from the vehicle and connected to the vehicle through the communication network, and the communication device in the vehicle is operable for transmitting the data of facial characteristic points of the user in the vehicle to the video synthesizer through the communication network.

6. The system according to claim 1, wherein, a position of the user during the learning process being predefined, the first camera device is positioned in relation to said predefined position as the imaging system is positioned in the vehicle in relation the position of an occupant of the vehicle, and the second camera device is positioned in front of said predefined position so as to take video images of the user from the front.

7. The system according to claim 1, wherein a camera device of the imaging system in the vehicle is used as the first camera device, and a smartphone of the user is used as the display unit and the second camera device.

8. The system according to claim 1, further including a first selector for selecting the data of facial points of one user in the vehicle among the data of facial points of a plurality of occupants in the vehicle.

9. The system according to claim 1, further including:
an input means for inputting an identifier of the user in the vehicle participating to the video conference call; and
a second selector for selecting, among a plurality of video synthesizers each associated with one corresponding user, the video synthesizer corresponding to the inputted identifier,
wherein the artificial video of the face of the user is produced by the selected video synthesizer.

10. A vehicle including the system according to claim 1.

* * * * *